United States Patent
Thornton et al.

(10) Patent No.: US 11,157,922 B2
(45) Date of Patent: Oct. 26, 2021

(54) SMART DISPLAY SYSTEM

(71) Applicant: Purchase Point LLC, Chicago, IL (US)

(72) Inventors: Kelley R. Thornton, Chicago, IL (US); Paul J. Soldera, Sebastopol, CA (US); Craig Cameron Scott, Cheltenham Vic (AU); Robert E. Hoxie, Milford, CT (US)

(73) Assignee: PURCHASE POINT LLC, Chicago, IL (US)

( * ) Notice: Subject to any disclaimer, the term of this patent is extended or adjusted under 35 U.S.C. 154(b) by 73 days.

(21) Appl. No.: 15/603,645

(22) Filed: May 24, 2017

(65) Prior Publication Data

US 2017/0357986 A1    Dec. 14, 2017

Related U.S. Application Data

(60) Provisional application No. 62/347,166, filed on Jun. 8, 2016, provisional application No. 62/341,758, filed on May 26, 2016.

(51) Int. Cl.
| | |
|---|---|
| *G04F 10/00* | (2006.01) |
| *G06Q 30/02* | (2012.01) |
| *G06Q 20/20* | (2012.01) |
| *G01G 19/414* | (2006.01) |
| *G06Q 10/08* | (2012.01) |

(52) U.S. Cl.
CPC ..... *G06Q 30/0201* (2013.01); *G01G 19/4144* (2013.01); *G04F 10/00* (2013.01); *G06Q 20/202* (2013.01); *G06Q 20/203* (2013.01); *G06Q 20/208* (2013.01); *G06Q 10/087* (2013.01)

(58) Field of Classification Search
CPC . G05B 2219/31197; G04F 10/00; G01V 8/10; G06F 3/04842
See application file for complete search history.

(56) References Cited

U.S. PATENT DOCUMENTS

| | | | |
|---|---|---|---|
| 3,716,697 | A | 2/1973 | Weir |
| 4,419,734 | A | 12/1983 | Wolfson et al. |
| 4,819,015 | A | 4/1989 | Bullivant et al. |

(Continued)

FOREIGN PATENT DOCUMENTS

| | | |
|---|---|---|
| JP | 200721007 A | 2/2007 |
| JP | 2010233864 A | 10/2010 |

OTHER PUBLICATIONS

Mahesh D., Happiest Minds, "Smart Shelves for Retail: Redefine your In-Store Experience," 2014 (Publication Date: Apr. 4, 2016), http://www.happiestminds.com/wp-content/uploads/2016/06/Smart-Shelves-for-Retail-Redefine-your-In-Store-Experience.pdf, 8 pgs.

(Continued)

*Primary Examiner* — Peter Ludwig
*Assistant Examiner* — Avia Salman
(74) *Attorney, Agent, or Firm* — Dentons US LLP

(57) ABSTRACT

A display system is disclosed. The display system includes a merchandise display and a platform. The platform has the merchandise display mounted upon it. The platform includes: a processor; a weighing element in communication with the processor; and a wireless communications device in communication with the processor, wherein the platform is operable to communicate information about the weight change of the merchandise display with an external system.

11 Claims, 6 Drawing Sheets

(56) References Cited

U.S. PATENT DOCUMENTS

| | | | |
|---|---|---|---|
| 5,671,362 | A | 9/1997 | Cowe et al. |
| 6,346,680 | B1 | 2/2002 | Takahashi et al. |
| 6,694,221 | B2 | 2/2004 | Chavez et al. |
| 7,233,241 | B2 | 6/2007 | Overhultz et al. |
| 7,780,081 | B1 | 8/2010 | Liang |
| 8,203,459 | B2 | 6/2012 | Jones et al. |
| 9,275,361 | B2 | 3/2016 | Meyer |
| 2004/0210474 | A1* | 10/2004 | Hart .............. G06Q 10/06398 705/7.42 |
| 2005/0060246 | A1 | 3/2005 | Lastinger et al. |
| 2005/0171854 | A1* | 8/2005 | Lyon .............. G01G 19/4144 705/24 |
| 2007/0050272 | A1* | 3/2007 | Godlewski .......... G06Q 20/203 705/28 |
| 2007/0227784 | A1 | 10/2007 | Gudbjartsson et al. |
| 2009/0058644 | A1 | 3/2009 | French et al. |
| 2010/0010868 | A1 | 1/2010 | Aimone Catti |
| 2011/0153466 | A1 | 6/2011 | Harish et al. |
| 2011/0266232 | A1 | 11/2011 | Kahler et al. |
| 2012/0228240 | A1* | 9/2012 | Gentile ............... A47F 5/0823 211/1 |
| 2013/0117053 | A2 | 5/2013 | Campbell |
| 2013/0284806 | A1* | 10/2013 | Margalit .............. G06Q 30/06 235/382 |
| 2013/0308254 | A1 | 11/2013 | Checchi et al. |
| 2013/0317903 | A1 | 11/2013 | Majrani |
| 2014/0289009 | A1 | 9/2014 | Campbell |
| 2014/0298365 | A1* | 10/2014 | Matsubara ............ H04H 60/31 725/12 |
| 2015/0127496 | A1 | 5/2015 | Marathe et al. |
| 2015/0206188 | A1* | 7/2015 | Tanigawa ........... G06K 9/00771 705/14.58 |
| 2015/0329260 | A1 | 11/2015 | Singh |
| 2015/0348060 | A1* | 12/2015 | Ogawa ................ G06T 11/206 705/7.29 |
| 2016/0132822 | A1* | 5/2016 | Swafford .............. A47F 1/126 705/28 |

OTHER PUBLICATIONS

Claire Swedberg, "ShelfX Unveils Store Shelves for Automating Purchases", RFID Journal, Publication Date: Nov. 2, 2011, http://www.rfidjournal.com/articles/view?8926, 2 pgs.

"StockVUE—Vendor Managed Inventory System Using Scales," http://www.loadstarsensors.com/stockvue-vendor-managed-inventory-system-using-scale . . . , 2017, 10 pgs.

eVMI Sensor-Based Inventory Management, eTurns Remote Inventory Solutions, https://web.archive.org/web/20160718042932/http://www.eturns.com:80/solutions-overview/evmi-sensor-based-inventory-management, Jul. 23, 2014-Dec. 18, 2016, 3 pgs.

Sogeti Labs, "Connected Shelves with Sensors and The Future of Shopping," http://Labs.Sogeti.com, Oct. 21, 2013, 7 pgs.

Weighing Components for Remote Inventory Solutions, Mettler Toledo, https://www.mt.com/my/en/home/library/product-brochures/other/IndRemoteInven/jcr:content/download/tile/file.res/DS_Remote_inventory_120105.pdf , 2012, 8 pgs.

PENCOM—Peninsula Components, "Visible Inventory", http://www.pencomsf.com/visible-inventory/, 2017, 3 pgs.

International Search Report dated Aug. 4, 2017 cited in Application No. PCT/US207/034291, 13 pgs.

* cited by examiner

SMART DISPLAY SYSTEM

RELATED APPLICATION

This application claims benefit of U.S. Provisional Patent Application No. 62/347,166 titled "IMPROVED SMART DISPLAY SYSTEM" filed on Jun. 8, 2016, the entirety of which is hereby incorporated by reference, as well as U.S. Provisional Patent Application No. 62/341,758 titled "SMART DISPLAY SYSTEM" filed on May 26, 2016, the entirety of which is hereby incorporated by reference.

TECHNICAL FIELD

The present disclosure relates generally to merchandise display systems, and more particularly, smart display systems for data collection of a retail shopper's engagement with in-store displays.

BACKGROUND

Display systems are placed into stores to enhance the display and sales of merchandise. Display systems presently in use tend to be temporary or semi-permanent use vehicles that have no electronics and gather no information about customer interaction with the merchandise or the display.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

A display system is provided. The display system includes: a point of purchase display; a platform in physical communication with the merchandise display, the platform including: a processor; a weighing element in communication with the processor, wherein the weighing element weighs the merchandise display; and a wireless communications device in communication with the processor, wherein the platform is operable to communicate information about the weight change of the merchandise display with an external system.

A method is provided, including: determining a base load weight for a display loaded with a plurality of product units of count c each having a weight, w; monitoring the weight of the loaded display; and when the weight of the display changes by w, decreasing the count c of the number of products on the display by one.

FIGURES

The accompanying drawings, which are incorporated in and constitute a part of this disclosure, illustrate various aspects. In the drawings.

DETAILED DESCRIPTION

Overview

Figure 1A:
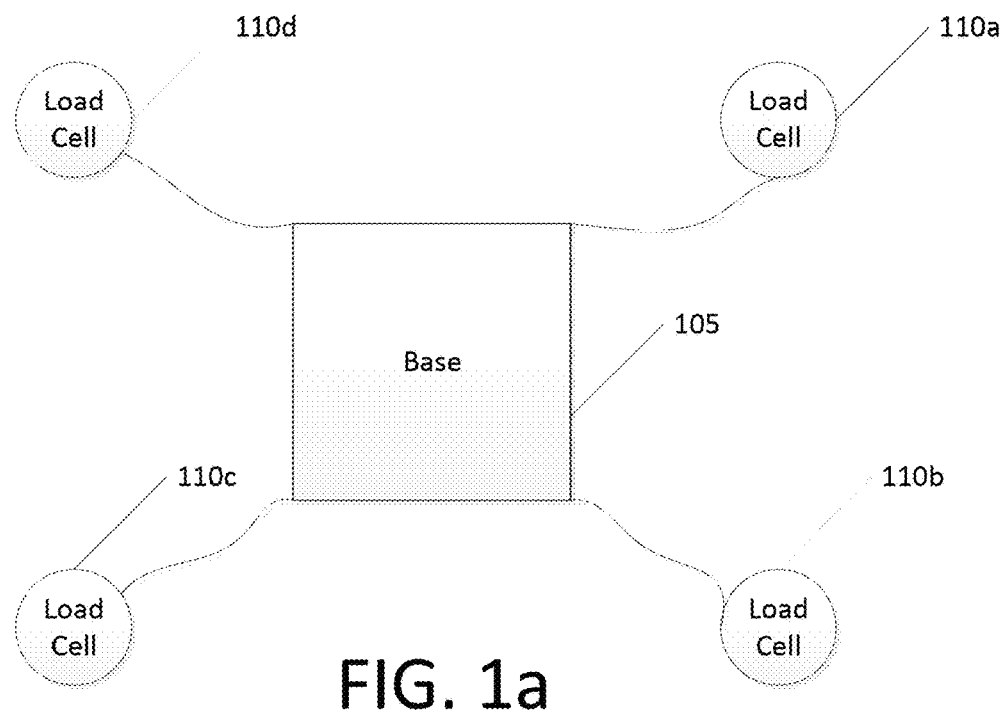
FIG. 1a illustrates a top view of a base tethered to load cells consistent with embodiments of the present invention.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

The present disclosure provides a smart display system that provides data collection on a retail shopper's engagement with in-store merchandising, displays, and products to ascertain the effectiveness of such merchandising. The data can also apply to understanding merchandising display compliance issues and to help manage out of stock at both primary shelf locations and secondary merchandising locations. The general system is reusable (or can be reskinned) in different applications.

The present disclosure also provides a product notification and replenishment system. This assists with the replenishment of products that consumers frequently buy using the same technology as the smart display system described above. The basic system includes hardware supported by a user application, which the consumer interacts with to be alerted when their inventory is getting low and places product orders for replenishment product. An example may be for dog food that may ship directly to consumers, sitting on the smart base along with an app that may alert the consumer when he is running low, thus creating a new order to automatically ship to the consumer.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

The system may be modular so that the basic concept/ technology could be reused and applied to several different embodiments. A merchandising smart display with product or product itself may sit on a base or mat. The system may have a power source and relay on technology such as near field communication ("NFC") or scanner or other method to detect a load on the system, and to connect the system and or load to shoppers/consumers. The base or mat includes technology to calculate load and has a control center that houses the electronics either separately or integrated into the base/mat. The system will detect the load's weight and the weight of any packaging and/or display and/or product set upon it, then calculate the difference between the full load and the load as product is being removed, thus it will know when the product is removed. The smart display will connect and stream data to the Internet using a wired or wireless connection, for example but not limited to WiFi, Cellular, Ethernet or some combination of networks. Human/shopper detection systems may know if someone was in front of the system and for how long. This system may also work within a shopper's place of residence as a replenishment device for household consumable products.

The system may detect at least the following events: Full; Overloaded; Restock; Empty; Lift (zero weight); Tilt; Item picked up; Item replaced (with duration); Restock event (multiple replace, or after hours); Frequency; Movement; Compliance (all components accounted for, properly installed, wrong product displayed); Time of shopper engagement; Amount of shopper traffic around merchandising; Dwell Time; Proximity; Face/Gender/Age Detection; and Shopper Gaze.

A provider may maintain the hardware, software, and database. The provider may coordinate and manage the administration of any test, then interpret the data for a fee to its clients. The provider may license or brand the product for consumer use.

Figure 1B:
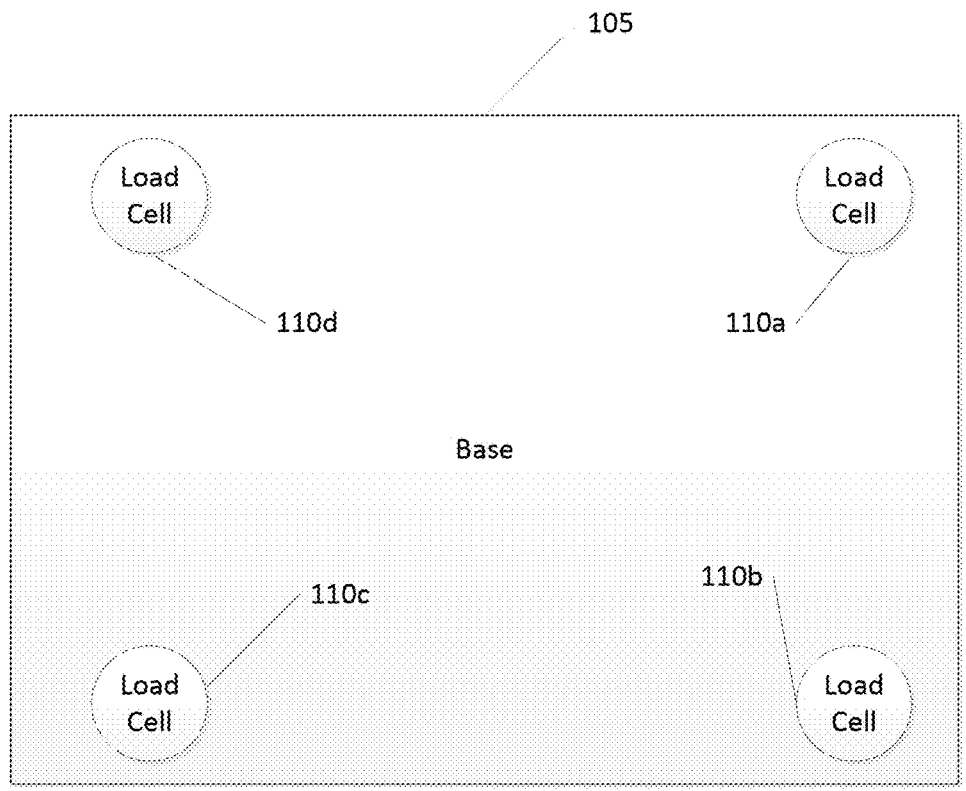
FIG. 1b illustrates a top view of a base mounted on load cells consistent with embodiments of the present invention.

FIG. 1a illustrates a top view of a base tethered to load cells consistent with embodiments of the present invention and FIG. 1b illustrates a top view of a base mounted on load cells consistent with embodiments of the present invention. The smart display may include a base 105 in communication with one or more load cells 110a-d. The base 105 typically incorporates the electronics for the smart display. The load cells 110 may be mounted separate from the base 105, or the base 105 may be mounted on top of the load cells 110. The product display 115 (illustrated in FIG. 1c) may be mounted such that weight of the product display is carried by the load cells 110. So long as the product display 115 is mounted so that the load cells 110 carry the weight, the exact configuration of number and location of the load cells 110 with respect to the base 105 can vary.

Figure 1C:
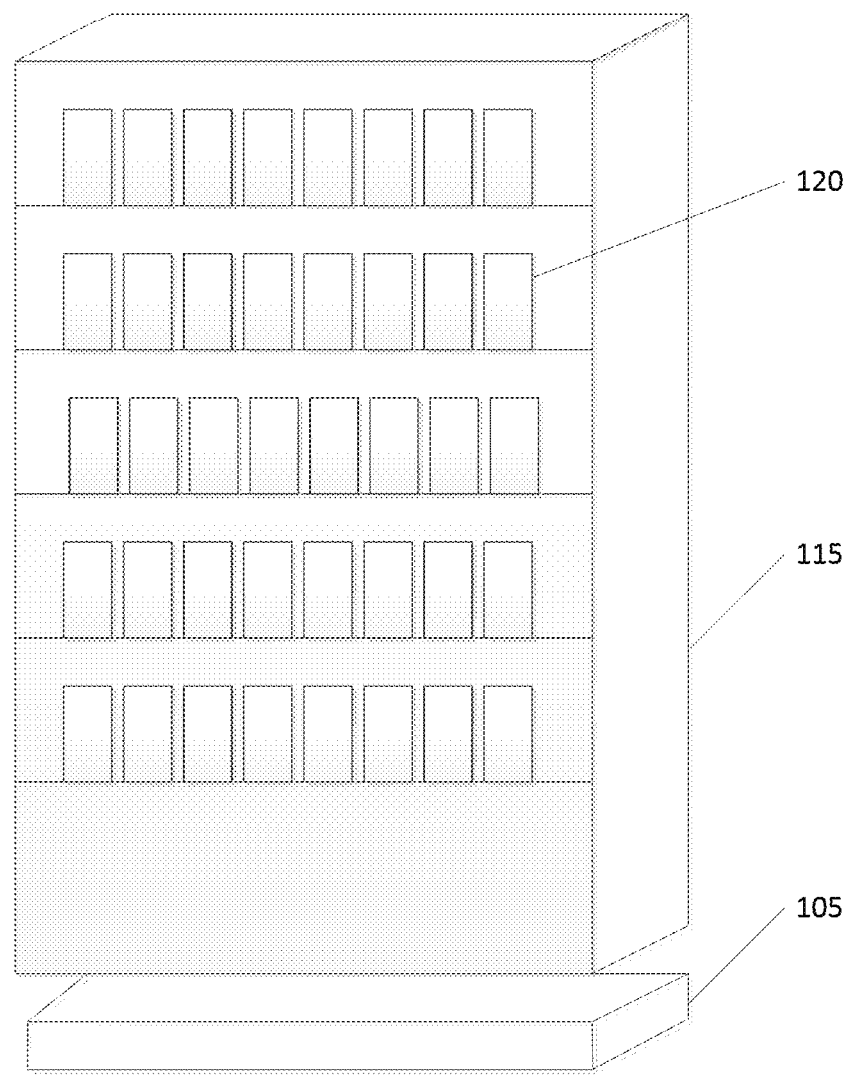
FIG. 1c illustrates a three dimensional view of a product display mounted on a base consistent with embodiments of the present invention.

FIG. 1c illustrates a three dimensional view of a product display mounted on a base consistent with embodiments of the present invention. A product display 115 of the smart display is mounted on or above the base 105 and load cells 110 (not shown). In certain configurations, the base 105 may be located separate and apart from the product display 115, with the product display 115 being carried directly on the load cells 110. The configuration illustrated in FIG. 1c is for an exemplary embodiment where the base is mounted upon the load cells 110. As product 120 is removed from or placed within product display 115, the weight carried by the load cells will decrease or increase, respectively, and the smart display will know from the changing weight on the load cells 110 that product quantity is changing. Mounted on the product display 115, the base 105, or elsewhere in proximity to the product display is a proximity sensor, illustrated in FIG. 2, that can detect the presence of individual consumers in front of the product display 115. Thus, inputs to the smart display include a proximity sensor for detecting people in front of the display and one or more load cells 110 for detecting changing weight in the product display. From these inputs, the smart display system can detect, for example, someone approaching the product display 115, taking or removing a product 120, and the length of time that she lingers in front of the product display. Various metrics can be calculated based on these inputs.

Figure 2:
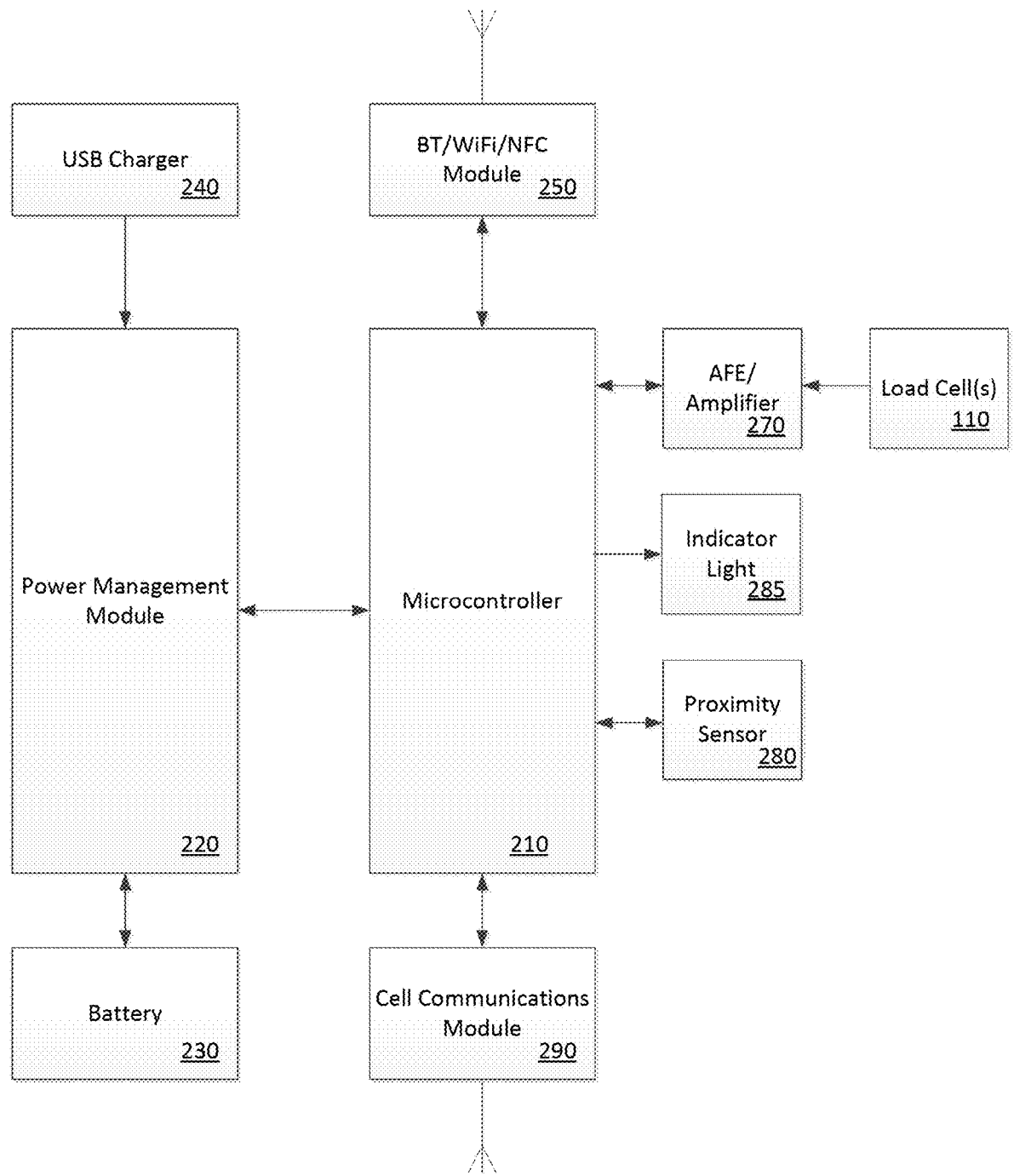
FIG. 2 illustrates an electronic block diagram of the hardware that embodies the smart display consistent with embodiments of the present invention.

FIG. 2 illustrates an electronic block diagram of the hardware that embodies the smart display consistent with embodiments of the present invention. A microcontroller 210, such as one provided by ST Microelectronics, serves as the microprocessor communicating with the various inputs and outputs of the smart display. The microcontroller 210 runs the software illustrated in the flowcharts of FIGS. 3-5 to calculate changing product quantities and the presence and absence of people in front of the smart display. The microcontroller 210 is in communication with a power management module 220, such as the Maxim MAX14676, which provides power to the various components of the smart display. The microcontroller 210 can read certain information from the power management module 220, such as battery level, and communicate this information to users or operators of the smart display. The power management module 220 is in communication with a USB charger 240 for charging a battery 230, with which the power management module 220 is also in communications. The battery 230 supplies power to the power management module 220 that provides power to the smart display. In an alternative embodiment, the smart display may be powered by AC power running to the power management module 220.

The microcontroller is in communication with at least two wireless modules: a bluetooth/wifi/nfc module 250, such as those manufactured by Broadcomm; and a wireless cell communications module 290, such as the Sierra Wireless Airprime HL8548. The bluetooth/wifi/nfc module 250 provides for bluetooth communication to nearby devices, as well as wifi communications to a central server in wifi proximity to the smart display. The bluetooth/wifi/nfc module 250 also provides for near field communication capability to read product information from product that will be placed within the smart display. In this way, the smart display will know what product is being stocked within the smart display. A proximity sensor 280, such as an optical sensor, thermal sensor, infrared sensor, infrared laser or camera, may be placed in communication with the microcontroller 210 to detect the presence, or absence, of an individual consumer in front of the smart display. Also, one or more load cells 110 are in communication with the microcontroller 210 via an amplifier and analog front end ("AFE") 270. The load cells 110 read the weight of a product display mounted within the smart display.

An indicator light 285 may be, for example, one or more LED's and is coupled to microcontroller 210. The indicator light 285 may show charge state or be used for diagnostic purposes.

Figure 3:
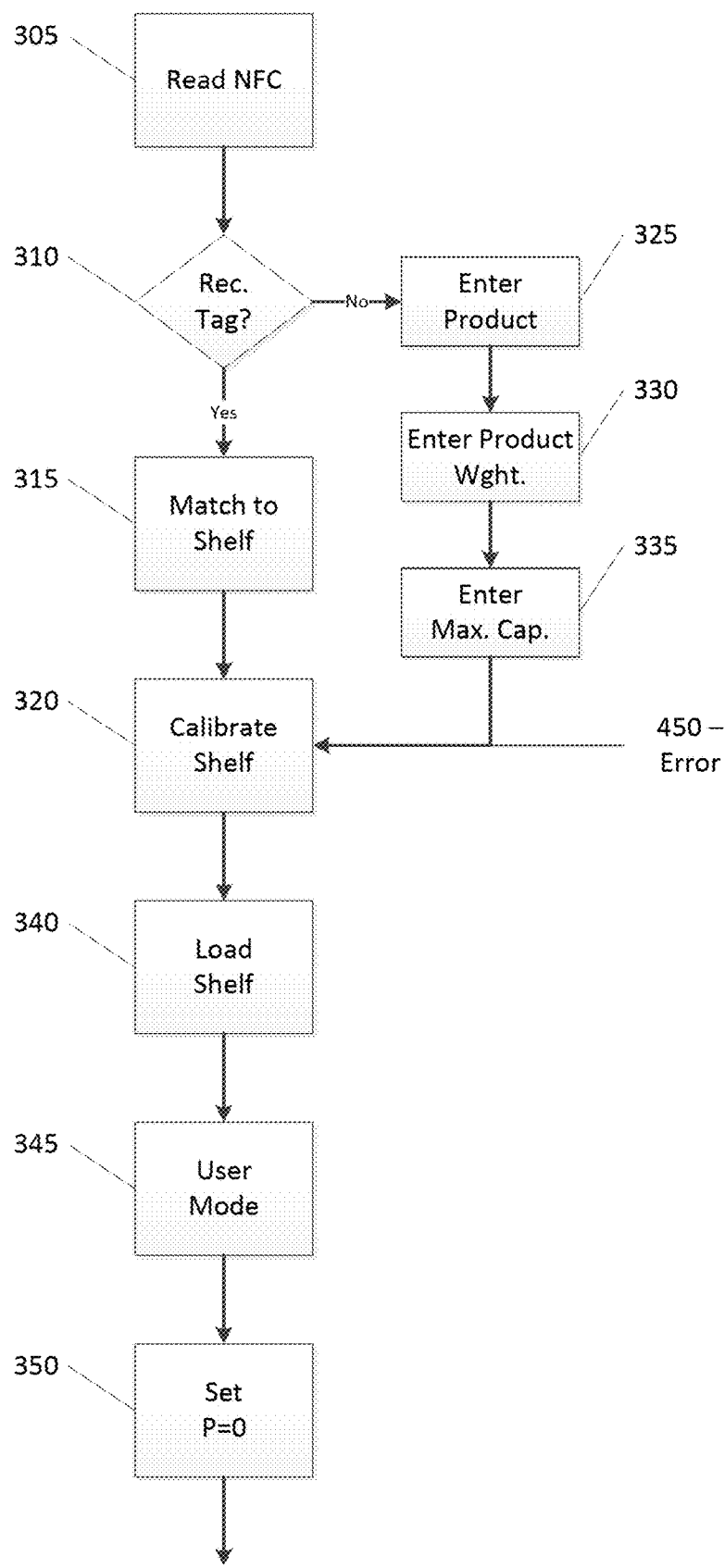
FIGS. 3-5 illustrate a flow chat of the operation of the software running on the smart display consistent with embodiments of the present invention.
Figure 4:
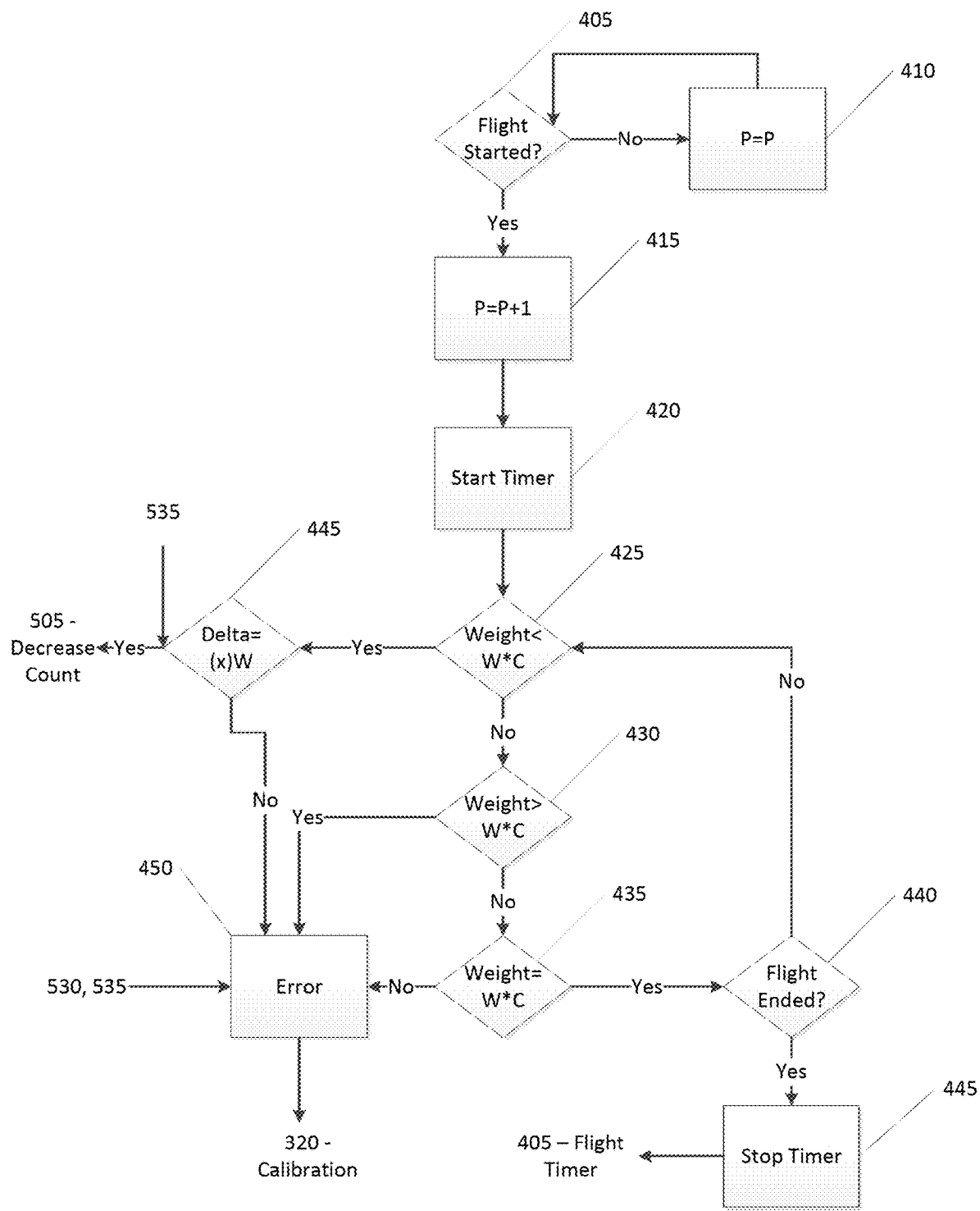
Figure 5:
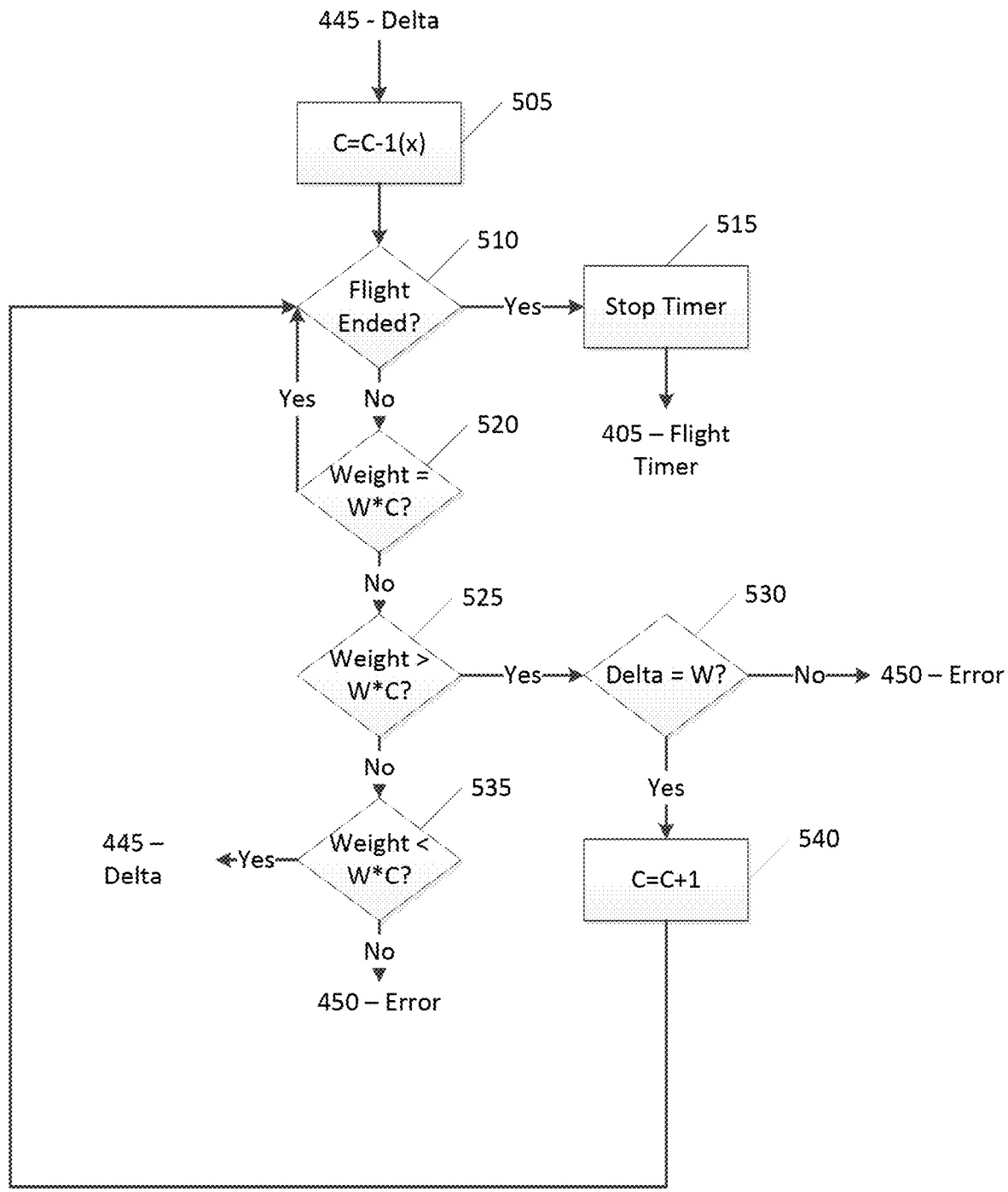

FIGS. 3-5 illustrate a flow chat of the operation of the software running on the smart display consistent with embodiments of the present invention. When the smart display is initially powered on, the nfc module 250 attempts to read an nfc tag from within the smart display (stage 305). If the nfc module 250 can read an nfc tag (stage 310), it associates the nfc tag with the smart display (stage 315) and the shelf is calibrated (stage 320). If the nfc module 250 cannot read an nfc tag for a product associated with the smart display, a product identification is received from a user configuring the system (stage 325), as well as the single product weight, w, (stage 330) and the maximum capacity of the smart display (stage 335). The smart display is then calibrated (stage 320).

Following calibration at stage 320, the smart display is loaded (stage 340) and the smart display is placed into "user mode" (stage 345) where the smart display is ready to engage with customers. Initially, the number of people, p, that have approached the smart display is set at zero (stage 350). A check is made using the proximity sensor 280 to see if someone has approached the smart display (stage 405). If no one is in front of the smart display, the number of people that have approached remains the same (stage 410, and the smart display waits for someone to approach (stage 405). If someone has approached the smart display, the number of people in front of the smart display is incremented (stage 415) and a timer is started (stage 420) to measure the amount of time that that person is engaging with the smart display.

A series of weight checks are then conducted. If the weight of the smart display is less than the weight of an individual product, w, times the count, c, of the number of products currently on the smart display (stage 425), then the smart display has detected that product has been removed from the smart display. If the difference in the weight of the product display, delta, is equal to a multiple of the weight, w, of an individual product, then the count of product on the display is decreased at stage 505. If the difference in the weight of the product display, delta, is not equal to a multiple of the weight, w, of an individual product, then an error has occurred and flow continues to an error stage (stage 450).

If the weight of the product is not less than the weight of an individual product, w, times the count of products on the smart display, then a check is made to see if the weight is greater than the weight of an individual product, w, times the count, c (stage 430). If so, an error has occurred and flow continues to stage 450. If not, a check is made to see if the weight is equal to the weight of an individual product, w, times the count of products on the smart display (stage 435). If not, an error has occurred and flow continues to the error block (stage 450). If so, a check is made to see if the user has left the front of the display (stage 440). If the user has not left the front of the display, the timer continues and flow goes to stage 425, but if the user has left the front of the display, the timer is stopped at stage 445 and flow then returns to stage 405.

If an error has occurred, the error block returns control to the calibration block at stage 320 and an error may be reported.

Returning to the need to decrease the count discussed with respect to stage 445, at stage 505 the count of items on the smart display is decremented by the number of items removed from the smart display. The number of items can be determined by dividing delta (the change in weight) by the weight of an individual product, w. Following decrementing the weight, a check is made to see if the individual has left the front of the display (stage 510). If so, the timer is stopped (stage 515) and the system returns to stage 405 to await a new approach by an individual. If the user is still in front of the display, a check is made to see if the weight of the display is equal to the weight of an individual product, w, times the count, c (stage 520). If so, flow returns to stage 510. If not, a check is made to see if the weight if the display is greater than the weight of an individual item, w, times the count, c (stage 525). If so, a check is made to see if delta is equal to w. If it is not an error has occurred and flow returns to stage 450 (the error stage). If it is, the count is incremented (stage 540) and flow returns to stage 510.

if the weight of the display is not greater than the weight of an individual product, w, times the count, c (stage 525), then a check is made to see if the weight is less than the weight of an individual item, w, times the count, c (stage 535) and if so flow returns to stage 445. If not, an error has been detected and flow returns to the error block 450.

Through the above software and hardware combination, the smart display can detect whether a display is full, overloaded, in need of restock, or empty. The smart display can also detect if the product display has been lifted off the load cells, or tilted. Furthermore, the display can detect if an item has been picked up or replaced (with duration of the event). Also, restock events can be detected via multiple replacements or replacement after hours). The frequency of consumer approach can be calculated; movement of shoppers; time of shopper engagement; amount of shopper traffic (i.e., number of shoppers) around merchandising; dwell time; and proximity can also be computed. Those skilled in the art after reading this disclosure will appreciate the wide range of statistics than can be gathered. In addition, as the count of product approaches a small value, automatic reordering can be accomplished. For example, the smart display system may be used within a home, as well as commercially, to, for example, provide for automatic reordering of goods such as dog food, for example.

Furthermore, through the use of the various wireless communications modules that are part of the system, all of this data can be communicated to a hub within the store or outside of the store in which the smart display is placed. Information may be transmitted over the Internet to a central server for storage and processing.

Embodiments of the electronics and systems powering the smart display system, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, microcode, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in the figures may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device on the single integrated circuit (chip).

What is claimed is:

1. An apparatus comprising:
   one or more weighing elements;
   a processor in communication with the one or more weighing elements;
   memory in communication with the processor and containing processor executable instructions;
   a proximity sensor in communication with the processor;
   a near field communications device in communication with the processor; and
   a wireless communications device in communication with the processor,
   wherein, when executed by the processor the processor executable instructions cause the processor to:
      determine, via the near field communications device, information about one unit of a product, the information including an expected weight of one unit of the product;
      determine, via the one or more weighing elements, a current weight, the current weight being a sensed total weight of one or more units of the product supported on the one or more weighing elements;
      calculate a count indicating how many units of the product are supported on the one or more weighing elements based on the current weight and the expected weight of the unit of the product,
      invoke a waiting mode in which the processor is caused to (a) continuously sense, via the proximity sensor, whether a person is proximate the one or more units of the product, (b) increment a person count, start a timer, and then invoke a first monitoring mode when the person is sensed to be proximate the one or more units of the product;
      in the first monitoring mode the processor is caused to (a) interrogate the one or more weighing elements and re-sense the current weight of the one or more units of the product, (b) compare the current weight with an expected weight, the expected weight being a result of a multiplication of the expected weight of one unit of the product and the count, (c) determine that the person has removed one or more units of the product from being supported by the one or more weighing elements when the re-sensed current weight is less than the expected weight and a difference between the re-sensed current weight and the expected weight is equal to a multiple of the expected weight of one unit of the product and then invoke a second monitoring mode, (d) decrement the count by the multiple and, if the person is still proximate the one or more units of the product, invoke a second monitoring mode, else stop the timer, calculate a dwell time as that that time elapsed from start of the timer to stop of the timer, and re-invoke the waiting mode, (e) enter into an error mode if the re-sensed current weight is greater than the expected weight or the difference between the re-sensed current weight and the expected weight is not equal to the expected weight of a multiple of the expected weight of one unit of the product, (f) sense, via the proximity sensor, whether the person is still proximate the one or more units of the product, and (g) stop the timer, calculate the dwell time as that time elapsed from start of the timer to stop of the timer, and re-invoke the waiting mode when the person is no longer proximate the one or more units of the product;
      in the second monitoring mode, the processor is caused to (a) interrogate the one or more weighing elements and re-sense the current weight of the one or more units of the product, (b) determine that the person has placed one or more units of the product on the one or more weighing elements when the re-sensed current weight is greater than the expected weight and a multiple of the expected weight of one unit of the product, (c) increment the count by the multiple and, if the person is still proximate the one or more units of the product, remain in the second monitoring mode, else stop the timer, calculate the dwell time, and re-invoke the waiting mode, and (d) enter the error mode when the re-sensed weight of the one or more products is less than a multiple of the expected weight of one unit of the product; and
      communicate, via the wireless communications device, how many of the one or more units of the product were removed from being supported by the one or more weighing elements by the person and the dwell time.

2. The apparatus of claim 1, wherein the proximity sensor is an optical sensor.

3. The apparatus of claim 1, wherein each weighing element is a loadcell.

4. The apparatus of claim 1, further comprising a battery in communication with the processor, the one or more weighing elements, and the wireless communications device for providing power.

5. The apparatus of claim 1, wherein the wireless communications device is a cellular modem.

6. The apparatus of claim 1, wherein the wireless communications device is a wifi transmitter.

7. A method comprising:
- determining, via near field communications device, information about one unit of a product, the information including an expected weight of one unit of the product;
- determining, via one or more weighing elements, a current weight, the current weight being a sensed total weight of one or more units of the product supported on one or more weighing elements;
- calculating a count indicating how many units of the product are supported on the one or more weighing elements based on the current weight and the expected weight of the unit of the product,
- invoking a waiting mode in which a processor is caused to (a) continuously sense, via the proximity sensor, whether a person is proximate the one or more units of the product, (b) increment a person count, start a timer, and then invoke a first monitoring mode when the person is sensed to be proximate the one or more units of the product;
- in the first monitoring mode causing the processor to (a) interrogate the one or more weighing elements and re-sense the current weight of the one or more units of the product, (b) compare the current weight with an expected weight, the expected weight being the product of the expected weight of one unit of the product and the count, (c) determine that the person has removed one or more units of the product from being supported by the one or more weighing elements when the re-sensed current weight is less than the expected weight and a difference between the re-sensed current weight and the expected weight is equal to a multiple of the expected weight of one unit of the product and then invoke a second monitoring mode, (d) decrement the count by the multiple and, if the person is still proximate the one or more units of the product, invoke a second monitoring mode, else stop the timer, calculate a dwell time as that that time elapsed from start of the timer to stop of the timer, and re-invoke the waiting mode, (e) enter into an error mode if the re-sensed current weight is greater than the expected weight or the difference between the re-sensed current weight and the expected weight is not equal to the expected weight of a multiple of the expected weight of one unit of the product, (f) sense, via the proximity sensor, whether the person is still proximate the one or more units of the product, and (g) stop the timer, calculate the dwell time as that time elapsed from start of the timer to stop of the timer, and re-invoke the waiting mode when the person is no longer proximate the one or more units of the product;
- in the second monitoring mode, causing the processor to (a) interrogate the one or more weighing elements and re-sense the current weight of the one or more units of the product, (b) determine that the person has placed one or more units of the product on the one or more weighing elements when the re-sensed current weight is greater than the expected weight and a multiple of the expected weight of one unit of the product, (c) increment the count by the multiple and, if the person is still proximate the one or more units of the product, remain in the second monitoring mode, else stop the timer, calculate the dwell time, and re-invoke the waiting mode, and (d) enter the error mode when the re-sensed weight of the one or more products is less than a multiple of the expected weight of one unit of the product; and
- when the person is no longer sensed to be proximate the one or more units of the product, communicating, via the wireless communications device, how many of the one or more units of the product were removed from being supported by the one or more weighing elements by the person and the dwell time.

8. The method of claim 7, further comprising determining if the one or more weighing elements are in a condition selected from the group consisting of full, overloaded, restock, empty, lifted, and tilted.

9. The method of claim 8, further comprising, when the condition of the one or more units of the product is determined as restock, sending an order for additional units of the product over the Internet to a supplier.

10. The method of claim 7, further comprising determining characteristics of the person, including gender and age detection.

11. The method of claim 7, further comprising counting persons who pass in front of the proximity sensor.

* * * * *